United States Patent
Horsfall et al.

(10) Patent No.: US 8,807,764 B2
(45) Date of Patent: Aug. 19, 2014

(54) METHOD AND APPARATUS FOR TURNING OFF A PROJECTOR

(76) Inventors: Robert Horsfall, Doncaster (GB); Andrew David Steers, Doncaster (GB)

(*) Notice: Subject to any disclaimer, the term of this patent is extended or adjusted under 35 U.S.C. 154(b) by 176 days.

(21) Appl. No.: 13/253,355

(22) Filed: Oct. 5, 2011

(65) Prior Publication Data

US 2012/0086921 A1    Apr. 12, 2012

(30) Foreign Application Priority Data

Oct. 6, 2010    (GB) .................... 1016764.1

(51) Int. Cl.
    *G03B 21/20*    (2006.01)
(52) U.S. Cl.
    USPC ........................................... 353/85
(58) Field of Classification Search
    USPC .............. 353/85; 363/21.01–21.18; 455/128
    See application file for complete search history.

(56) References Cited

U.S. PATENT DOCUMENTS

| 5,495,385 | A | | 2/1996 | Hsiu |
| 6,141,043 | A | * | 10/2000 | Suzuki et al. ............... 348/211.2 |
| 2007/0285625 | A1 | * | 12/2007 | Yavid et al. ....................... 353/85 |

FOREIGN PATENT DOCUMENTS

| GB | 2465190 A | 5/2010 |
| JP | 2005269864 A | 9/2005 |
| JP | 2007178635 A | 7/2007 |

* cited by examiner

*Primary Examiner* — Thanh Luu
*Assistant Examiner* — Renee Naphas
(74) *Attorney, Agent, or Firm* — Arthur Jacob

(57) ABSTRACT

A method of and apparatus for turning off a projector. The method and apparatus identify a condition to the effect that the projector should not be powered on, identify a condition to the effect that the power draw of the projector is above a threshold value, and instruct the projector to turn off.

4 Claims, 16 Drawing Sheets

METHOD AND APPARATUS FOR TURNING OFF A PROJECTOR

CROSS REFERENCE TO RELATED APPLICATIONS

This application claims priority from United Kingdom Patent Application No. 10 16 764.1 filed Oct. 1, 2010, the entire disclosure of which is incorporated herein by reference in its entirety.

BACKGROUND OF THE INVENTION

1. Field of the Invention

The present invention relates to a method and an apparatus for turning off a projector, in particular, but not exclusively, the turning off of a projector according to its programmed shut down routine when it is not in use.

2. Description of the Related Art

Many situations arise in which a projector is powered on but not in use, with power flowing through the projector's bulb. This has the effect of reducing the apparent lifetime of the projector bulb. Systems are known that sense that the bulb is emitting light and cut power to the projector, but do not allow for the fact that the bulb could be powered on inside the projector but no image projected. Additionally, current systems only interrupt the flow of power to the projector, which does not allow the projector to turn off in accordance with its programmed shut down routine. This can affect the longevity of the bulb's operational lifetime, as it is not allowed to cool slowly.

BRIEF SUMMARY OF THE INVENTION

According to an aspect of the present invention, there is provided a method comprising turning off a projector, including steps of identifying a condition to the effect that said projector should not be powered on, identifying a condition to the effect that the power draw of said projector is above a threshold value, and instructing said projector to turn off.

According to another aspect of the present invention, there is provided an apparatus for turning off a projector, comprising a processing device, memory, a sensor for detecting power draw and an infrared emitter, wherein said processing device is configured to identify a condition to the effect that said projector should not be turned on, identify a condition to the effect that the power draw of said projector is above a threshold value by using said sensor, and instruct said infrared emitter to emit a signal instructing said projector to turn off in accordance with its power down routine.

According to a further aspect of the present invention, there is provided projector apparatus comprising a projector, a processing device, memory, a sensor for detecting power draw and an infrared emitter, wherein said processing device identify a condition to the effect that said projector should not be turned on, identify a condition to the effect that the power draw of said projector is above a threshold value by using said sensor, and instruct said infrared emitter to emit a signal instructing said projector to turn off in accordance with its power down routine.

BRIEF DESCRIPTION OF THE DRAWINGS

FIG. 6 illustrates a timetable 601 stored in memory 304 describing dates and times at which the projector should and should not be powered on;

FIG. 10 illustrates steps carried out during step 403 to determine whether the project is currently on;

DETAILED DESCRIPTION OF EXAMPLE EMBODIMENTS

FIG. 1

Figure 1:
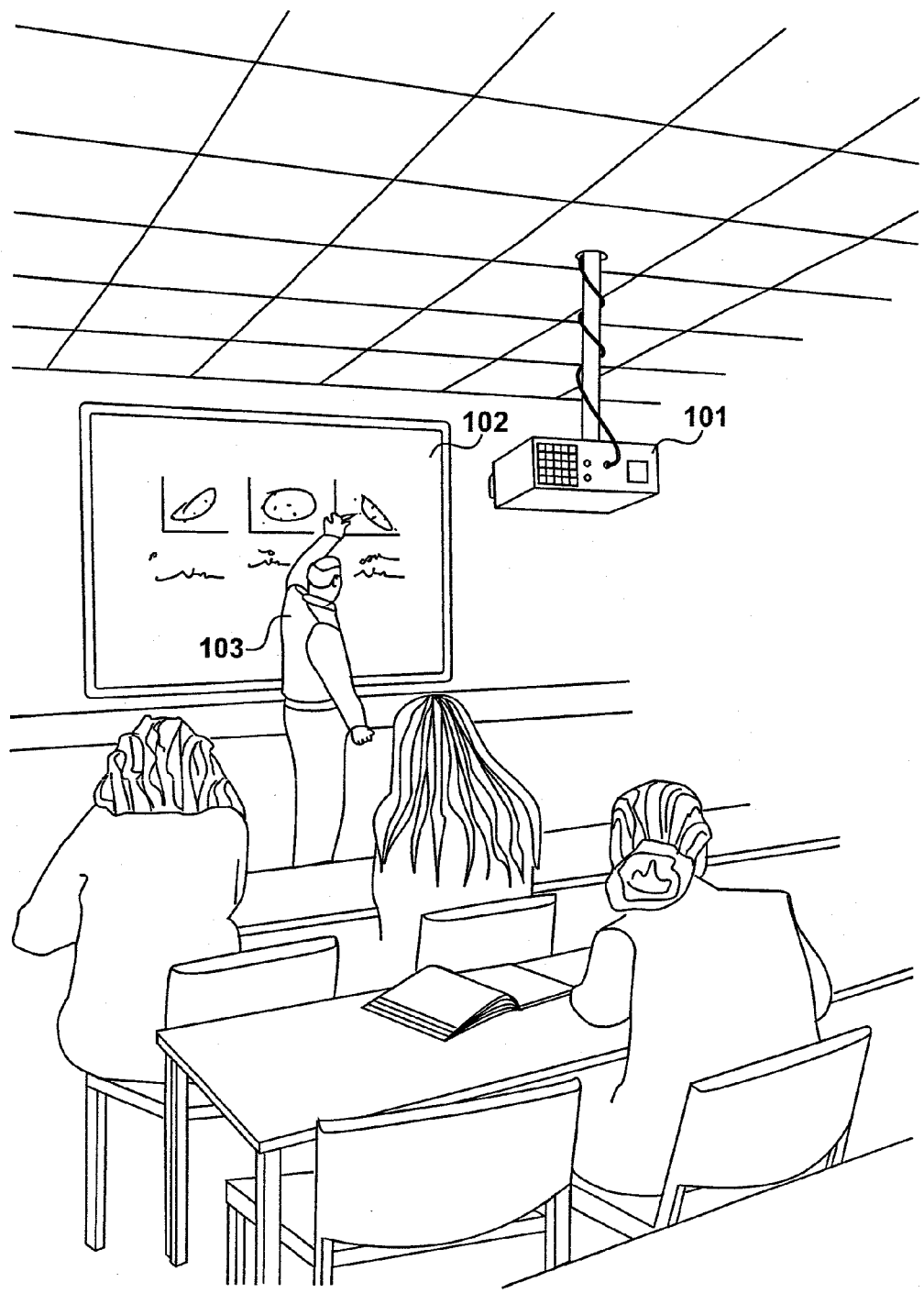
FIG. 1 shows an environment in which a projector 101 may be installed.

An environment in which a projector 101 may be installed is shown in FIG. 1.

Projector 101 is attached to a ceiling-mounted post 102, and is connected to a personal computer (not shown). Projector 101 projects the image produced by personal computer on to a screen such as an interactive whiteboard 102, which detects input by a user 103 which is in turn displayed.

In this example, projector 101 and interactive whiteboard 102 are being used in a classroom as an alternative to a traditional blackboard. Whilst it is occupied in the Figure, there are times of day when no lessons are taking place in the classroom shown in FIG. 1. Thus, the use of interactive whiteboard 102 will not be required. A timetable may therefore be defined that details periods during which the projector's use is required.

However, it is uncommon for the projector to be turned off during such periods of non-use, and thus it will still be projecting an image, such as a screensaver produced by the personal computer. This has the effect of reducing the apparent lifetime of the bulb within projector 101.

Thus, it is an object of the present invention to prolong the life of the bulb by automatically turning the projector off at times that is known that it will not be used.

FIG. 2

Figure 2:
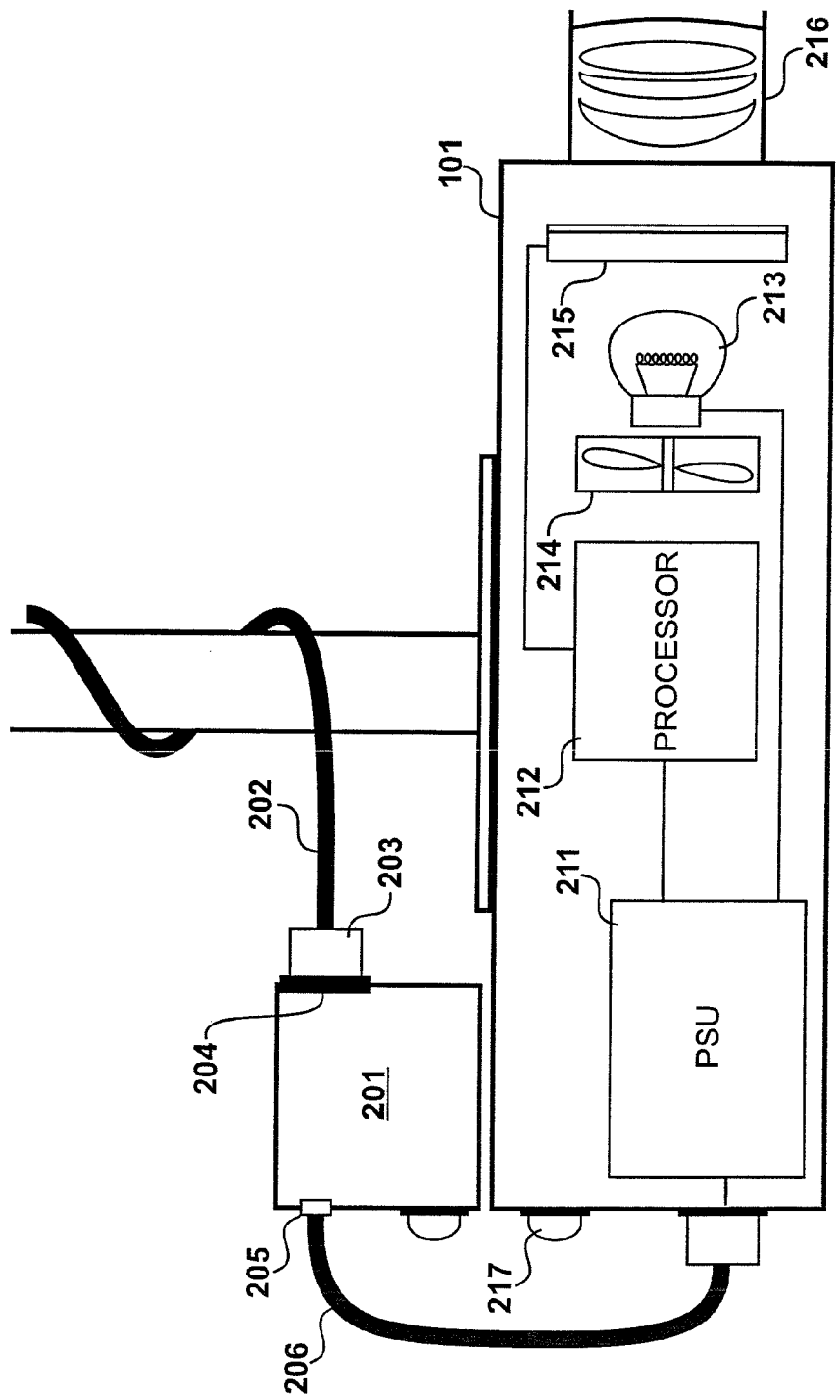
FIG. 2 shows components house within projector 101, along with an apparatus 201 for turning off projector 101.

Components house within projector 101 are shown in FIG. 2 along with an apparatus 201 for turning off projector 101.

Apparatus 201 receives power from a mains electrical supply via a power cord 202. Power cord 202 includes a plug 203 that is inserted into a mains input 204 in apparatus 201. A power cord 206 extends from a mains output 205 in apparatus 201, and is connected to projector 101. This allows apparatus 201 to both be powered from the mains electricity supply and monitor the flow of power to projector 101.

Projector 101 comprises a power supply unit 211, a processing device such as processor 212, a bulb 213 for providing illumination, a fan 214 to cool bulb 213, and a liquid crystal display 215 for defining an image for projection. Liquid crystal display receives instructions from processor 212 as to the colour and brightness value of each pixel that it comprises. Projector 101 further comprises a series of optics 216 to allow an image to be formed on a screen such as interactive whiteboard 102.

In order to allow a user to control projector 101, an infrared receiver 217 having a wide angle of view is included to allow a complementary remote control to broadcast instructions, including an instruction to shut down. Upon receiving a shut down command, processor 212 follows a power down routine that instructs bulb 213 to lower its brightness slowly, but instructs fan 214 to continue to cool bulb 213. This is to avoid a sudden drop in temperature that may cause damage to the filament in bulb 213.

Bulb 213 draws around 250 Watts of power, and has a mean time before failure of 1000 to 3000 hours. Additionally, its replacement is a relatively trivial exercise, which can be performed with projector 101 still attached to its mounting post.

Whilst some projectors employ light emitting diodes to provide illumination, which have a mean time before failure of around 20,000 hours. However, their cost can be prohibitive. Additionally, it is uncommon for the LED illumination element to be replaceable by a technician, and thus the entire projector must be replaced upon failure.

FIG. 3

Figure 3:
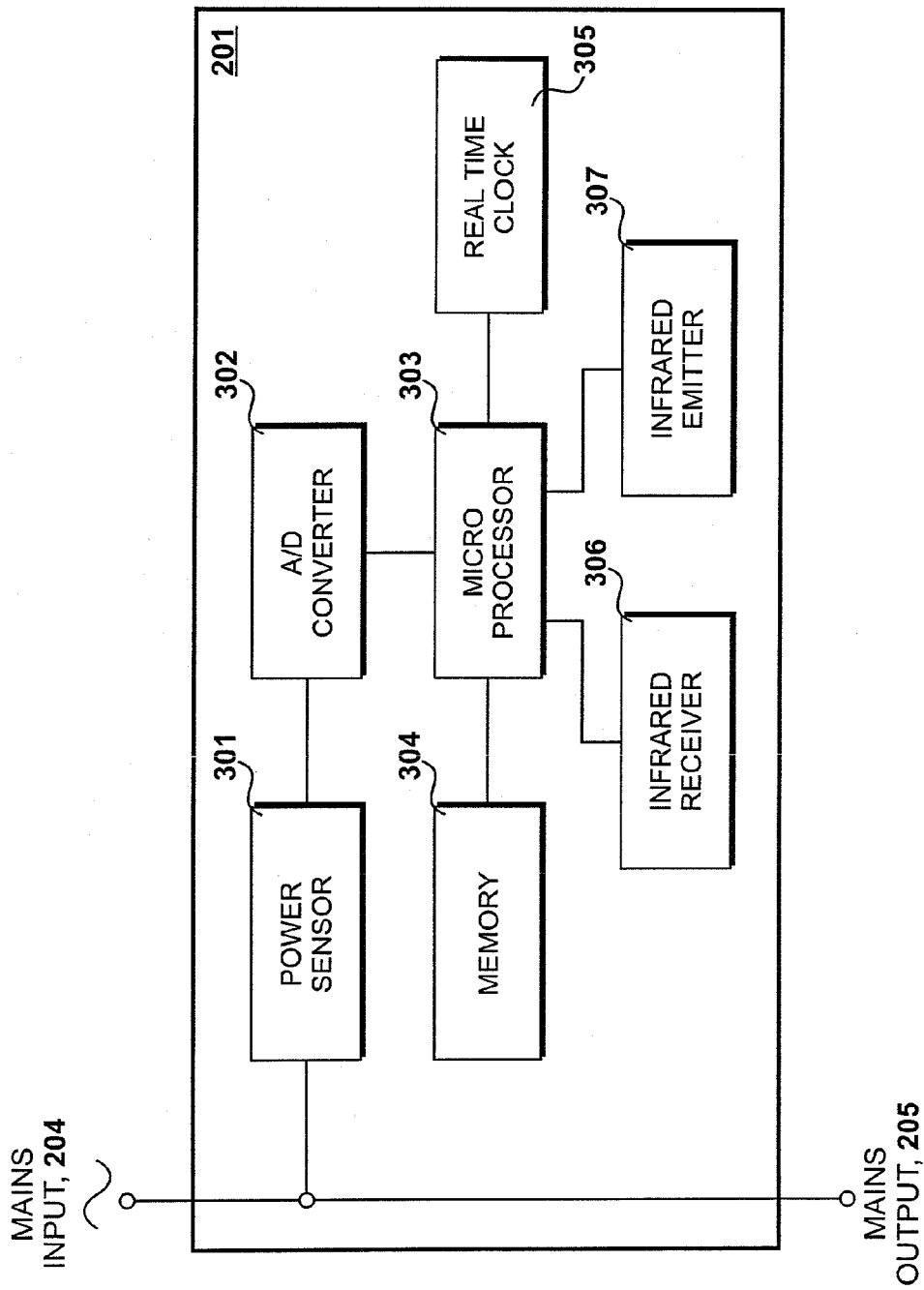
FIG. 3 is a block diagram illustrating components housed within apparatus 201.

FIG. 3 is a block diagram illustrating components housed within apparatus 201.

With many projectors, the same button is used to instruct the projector to turn off as to instruct the projector to turn on. If the projector is on, then, providing other conditions have been met, it can be turned off. It would be undesirable, however, for the apparatus to turn on the projector if it was off. Thus, apparatus 201 comprises a power sensor 301 for detecting the power draw of a projector from the mains electricity supply. This allows apparatus 201 to detect whether or not the projector is currently on.

The output from power sensor 301 is converted into digital samples by an analogue to digital converter 302, which feeds the digital samples to a processing device such as a microcontroller 303 where processing takes place in the digital domain. In alternative embodiments, analogue to digital converter 302 is not present, and all processing takes place using analogue electronics.

In this example, microcontroller 303 comprises a 1 MHz microprocessor for executing programs and instructions stored in memory 304, which in this example is provided by Flash-based storage. The use of Flash-based storage allows microcontroller 303 to write data to memory for later access. Memory 304 is also used to store user-defined variables, such as a timetable describing times at which the projector should and should not be turned on. Such a timetable will be described further with reference to FIG. 6.

Apparatus 201 further comprises a real time clock circuit 305 to allow microcontroller 303 to keep track of the current date and time. In this embodiment, real time clock circuit 305 comprises a 32.68 kHz quartz crystal, and issues an update to microcontroller 303 after each second has elapsed. Microcontroller 303 uses the update to increment a record of the current date and time in memory, the process of which will be described further with reference to FIG. 5. It is to be appreciated, however, that any other form of circuit that can provide an update to microcontroller 303 as to the current date and time could be used.

Also connected to microcontroller 303 is an infrared receiver 306 and an infrared emitter 307. The provision of infrared receiver 306 allows microcontroller 303 to sample and store in memory 304 a shutdown command issued to projector 101 by its complementary remote control. The process of sampling the infrared pulse sequence representing the shutdown command will be described further with reference to FIGS. 12 to 14.

Infrared emitter 307 allows the emission of an infrared signal according to the stored infrared pulse sequence and representing the shutdown command for projector 101. This emulation of the shutdown command for projector 101 allows the automation of turning off the projector in accordance with its power down routine. The process of emitting the shutdown command pulse sequence will be described further with reference to FIG. 15.

FIG. 4

Figure 4:
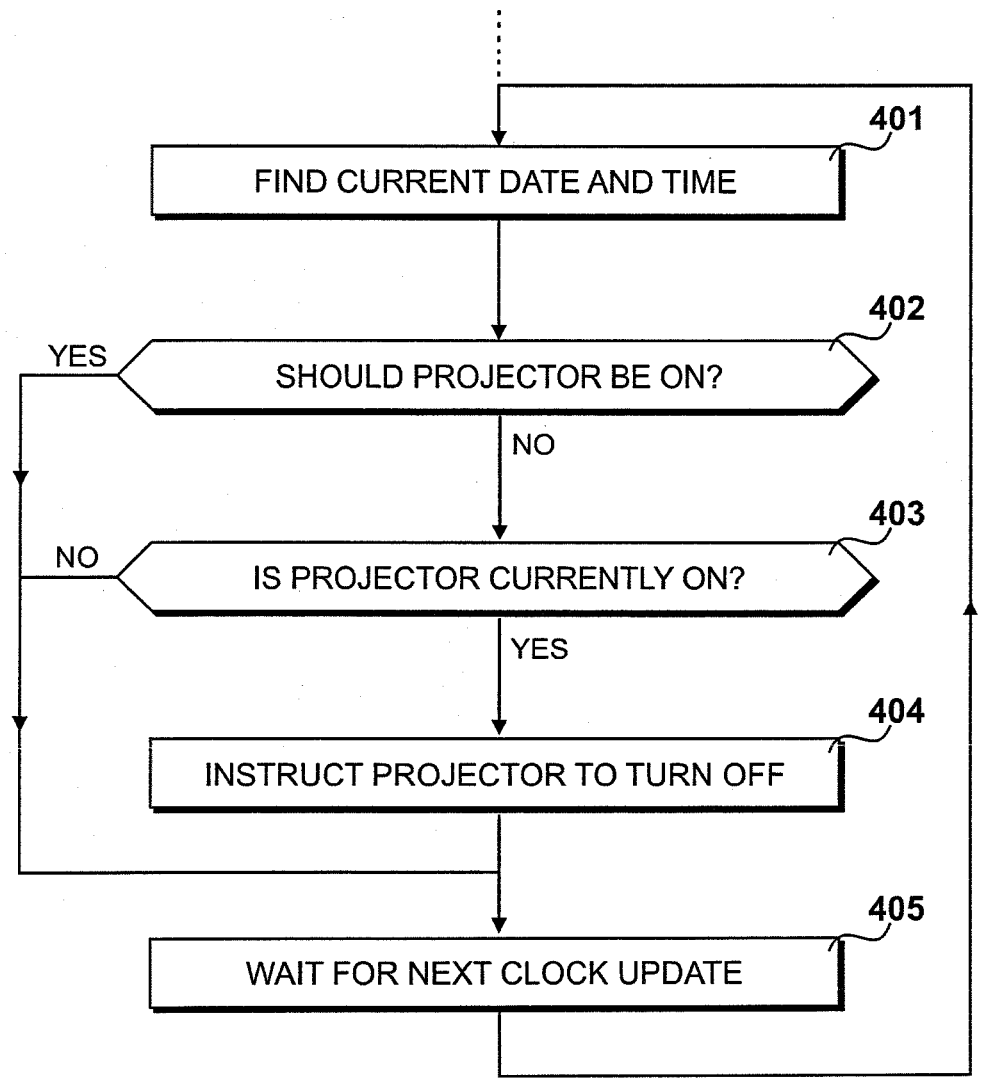
FIG. 4 illustrates steps carried out by microcontroller 303 to turn off projector 101.

Steps carried out by microcontroller 303 to turn off projector 101 are illustrated in FIG. 4.

At step 401, the current date and time are found. At step 402, a question is asked as to whether the projector should be on at that point in time, and if answered in the affirmative, then control proceeds to step 405 where microcontroller 303 waits for the next update from real time clock 305. If the question asked at step 402 is answered in the negative, then control proceeds to step 403 where a question is asked as to whether the projector is currently on. If this question is answered in the negative, then control proceeds to step 405. If the question is answered in the affirmative, then at step 404 the projector is turned off, and control proceeds to step 405.

By following the above method, apparatus 201 is only able to turn off projector 101 when it is off, and only at prescribed times of day.

FIG. 5

Figure 5:
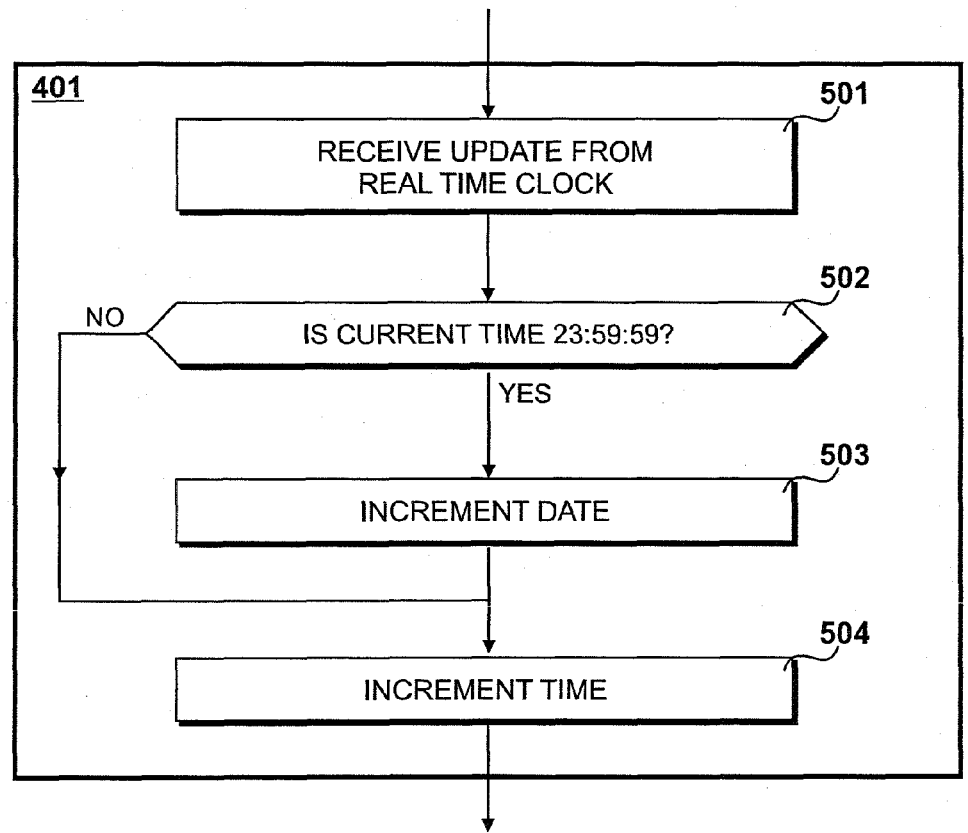
FIG. 5 shows steps carried out during step 401 to find the current date and time.

Steps carried out during step 401 to find the current date and time are detailed in FIG. 5.

Microcontroller 303 stores in memory 304 a record of the current date and time. This is updated every second when an update is received from real time clock circuit 305, although if higher accuracy is required real time clock circuit 305 would be set to provide updates at a higher frequency.

At step 501, an update is received from real time clock circuit 305 and at step 502, a question is asked as to whether the record of the current time is equal to 23:59:59 (i.e. one second before midnight). If this question is answered in the affirmative, then at step 503 the date stored in memory is incremented. The time is then incremented at step 504. If the question asked at step 502 is answered in the negative, then control skips step 503 and only the time is incremented at step 504.

FIG. 6

Figure 6:
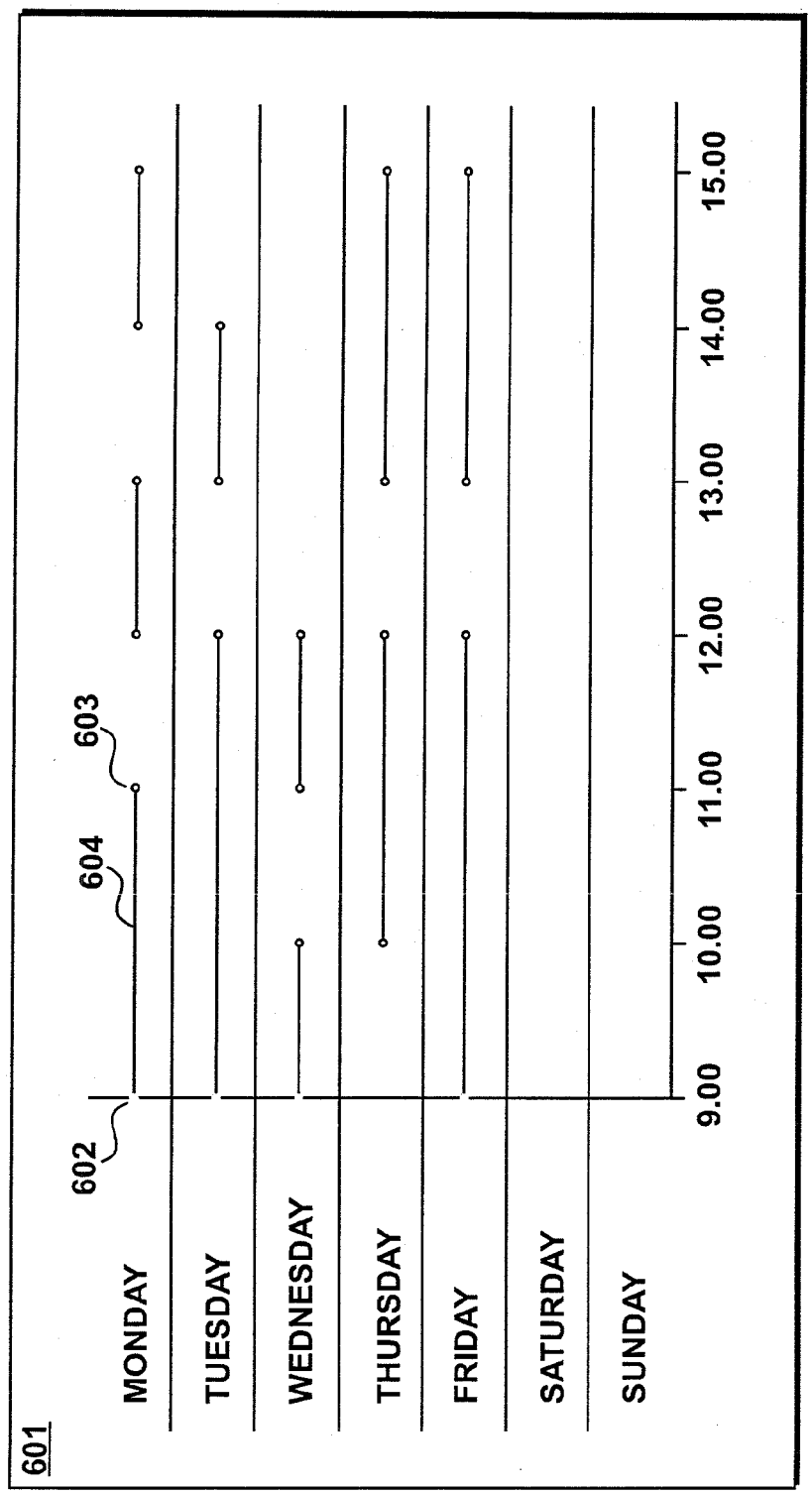

A timetable 601 stored in memory 304 describing dates and times at which the projector should and should not be powered on is illustrated in FIG. 6.

Timetable 601, whilst shown in graphical form in the Figure, is stored as a data structure in memory 304. The precise form of the data structure will depend on the type of microcontroller used. A possible data structure is one of a key-value type, with the key defining a range of times, and the value defining whether or not the projector should be powered on or not, for example.

Timetable 6 shows an example of a range of times during which the projector should and should not be powered on, with points such as points 602 and 603 illustrating changes in state. Lines such as line 604 extending between points illustrate periods during which the projector should be on. Gaps between points with no line illustrate periods during which the projector should be powered off.

Timetable 601 is configurable by a user such that the dates and times at which the projector should and should not be powered on may be changed in accordance with the needs of the environment in which apparatus 201 and projector 101 are installed.

Thus, during step 402 described previously with reference to FIG. 4, the microcontroller compares the current date and time with dates and times defined in timetable 601. This is performed by a process of querying the data structure in memory 304. This allows microcontroller 303 to decide whether the projector should or should not be powered on.

FIG. 7

Figure 7:
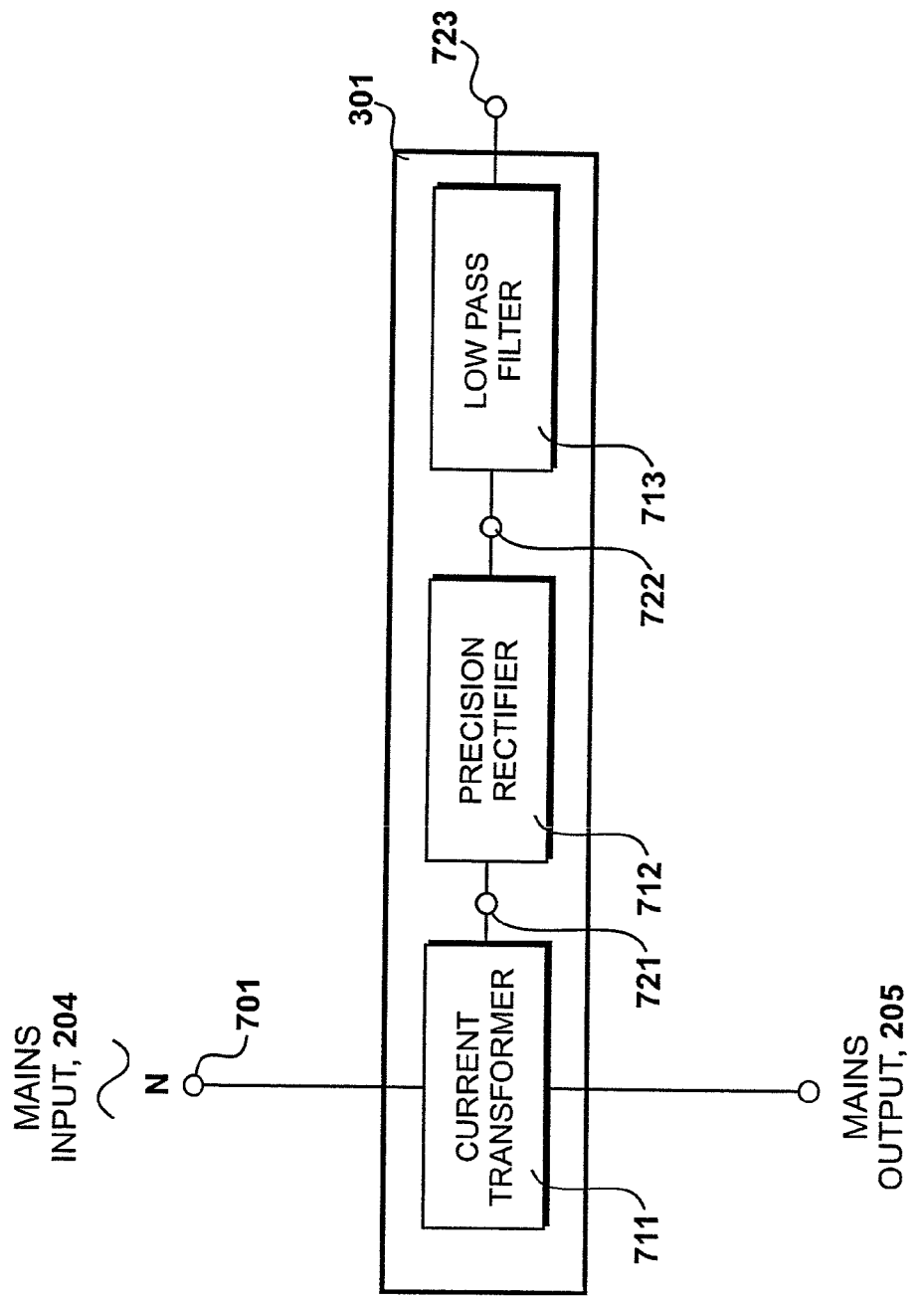
FIG. 7 shows the components that constitute power sensor 301.

Components that constitute power sensor 301 are shown in FIG. 7.

Mains input 204 receives electrical power from the mains electrical supply via a neutral line 701. The received electrical power is in the form of an alternating current, which varies in terms of voltage and frequency depending on location. Mains output 205 proceeds to deliver the received electrical power to projector 101.

Power sensor 301 comprises a detector for detecting flow of current such as current transformer 711, a rectifier such as precision rectifier 712 and a filter such as low pass filter 713.

Current transformer 711 serves to detect the current draw of projector 101 by outputting a voltage signal at output 721 proportional to the flow of current in neutral line 701. In this embodiment, the current transformer is of a 1000:1 (one-thousand to one) ratio, and thus a 1 Kilowatt current flowing in neutral line 701 will produce a output signal with an amplitude of 1 Volt at output 721. It is to be appreciated, however, that any other ratio may be used that is suitable for the components in apparatus 201. Additionally, whilst a current transformer is used in this embodiment, any other electrical arrangement that produces a voltage signal indicative of the amount of current flowing between mains input 204 and mains output 205 can be used.

As the electrical power is supplied as an alternating current, it must be rectified for any meaningful processing, such as time averaging, to take place. Thus, after sensing by current transformer 711, the voltage signal is supplied to a precision rectifier 712 to rectify the signal without a reduction in the level of the signal. Thus, the output signal at output 722 will be a rectified version of the output signal at output 721, and will maintain a level of 1 Volt.

In order to smooth the output signal from output 722, a low pass filter 713 is used with a cutoff frequency of 1 Hz. The use of such a low cuttoff frequency results in a very smooth, time-averaged output signal at output 723 indicative of the power draw of projector 101. Even if high-frequency changes occur in the power draw whilst projector 101 is turned on, they will not be reflected in the filtered signal, which will only contain low frequency components. However, the output signal will still indicate that there is power being drawn by projector 101, and thus indicates that it is powered on.

FIG. 8

Figure 8:
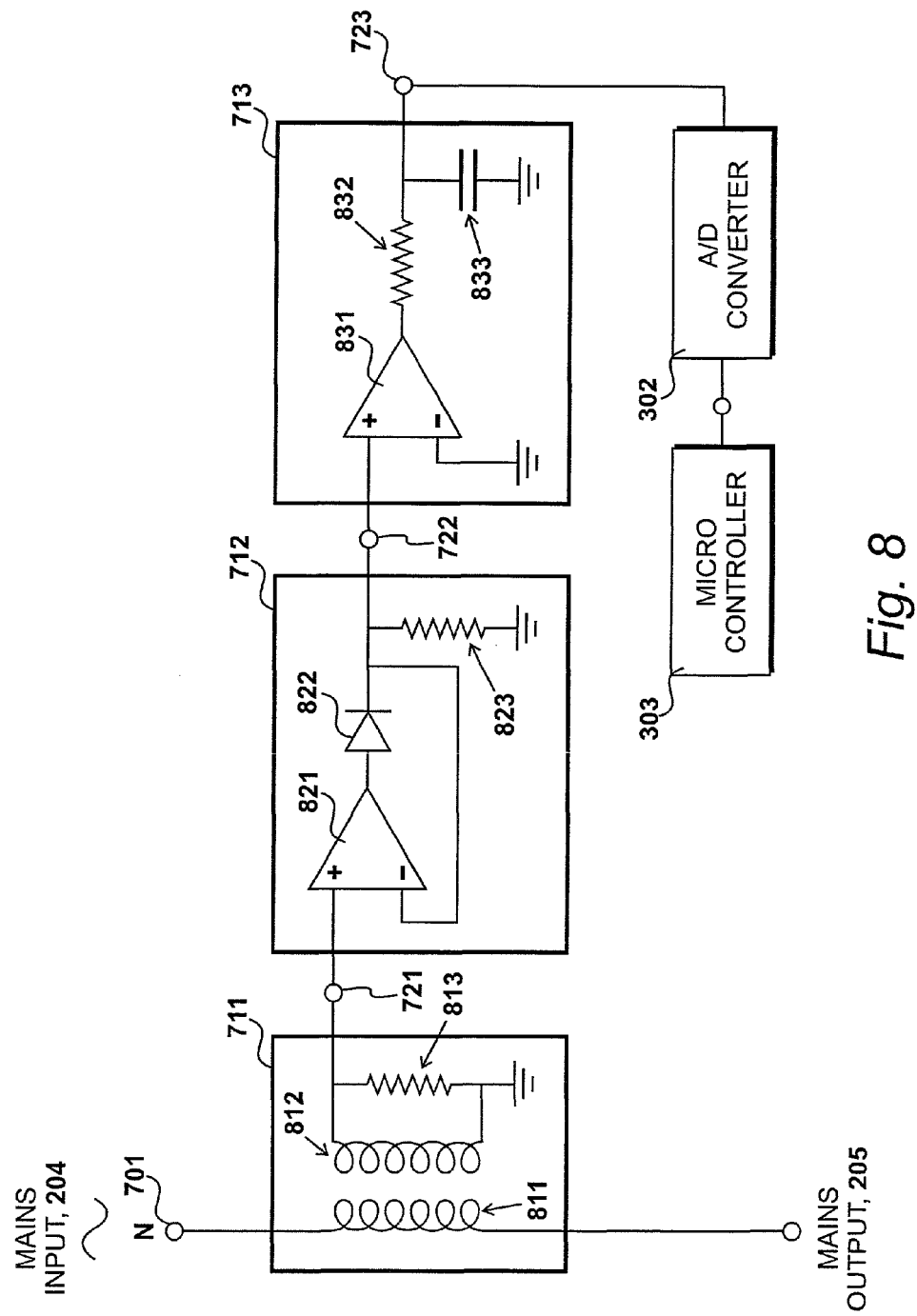
FIG. 8 shows in greater detail the components within current transformer 711.

Components within current transformer 711, precision rectifier 712 and low pass filter 713, and their relation to analogue to digital converter 302 and microcontroller 303 are shown in greater detail in FIG. 8.

Current transformer 711 comprises a first coil 811 placed within neutral line 701, and in close proximity to a second coil 812. A resistor 813 placed across second coil 812 results in a detected output signal with a voltage relative to ground being produced at output 721 proportional to the current flowing in neutral line 701.

Precision rectifier 712 comprises an operational amplifier 821, which receives the output signal from output 721 at its positive input, and feeds its output into a diode 822. The output from diode 822 provides feedback for the negative terminal of operational amplifier 821, and also feeds a rectified output signal to output 722 having a voltage relative to ground due to the presence of resistor 823.

Low pass filter 713 comprises a further operational amplifier 831, which receives the rectified signal from output 722 at its positive input, with its negative input connected to ground. The output out operational amplifier 831 passed through a resistor connected to ground by a capacitor 833, resulting in a filtered signal being produced at output 723.

The resulting (detected, rectified and filtered) signal from power sensor 301 is then passed to analogue to digital converter 302. In this embodiment, analogue to digital converter 302 is of 8-bit resolution, although higher or lower resolutions may be used depending on implementation. The resulting signal's voltage level is therefore converted into digital samples, and assigned into one of 256 bins ranging in level from 0 to 255.

Microcontroller 303 proceeds to compare the level of the digital samples outputted by analogue to digital converter 302 to a threshold value stored in memory 304. The threshold value is in this embodiment derived empirically by observing the output of the analogue to digital converter 302 when projector 101 is projecting an image, and then stored as a constant in memory 304 for reference. In an alternative embodiment, a plurality of threshold values are stored in memory corresponding to the measured power draw of a number of projector models, the particular value being selected in accordance with the model of projector apparatus 201 is combined with. The process of comparison is described further with reference to FIG. 10.

FIG. 9

Figure 9:
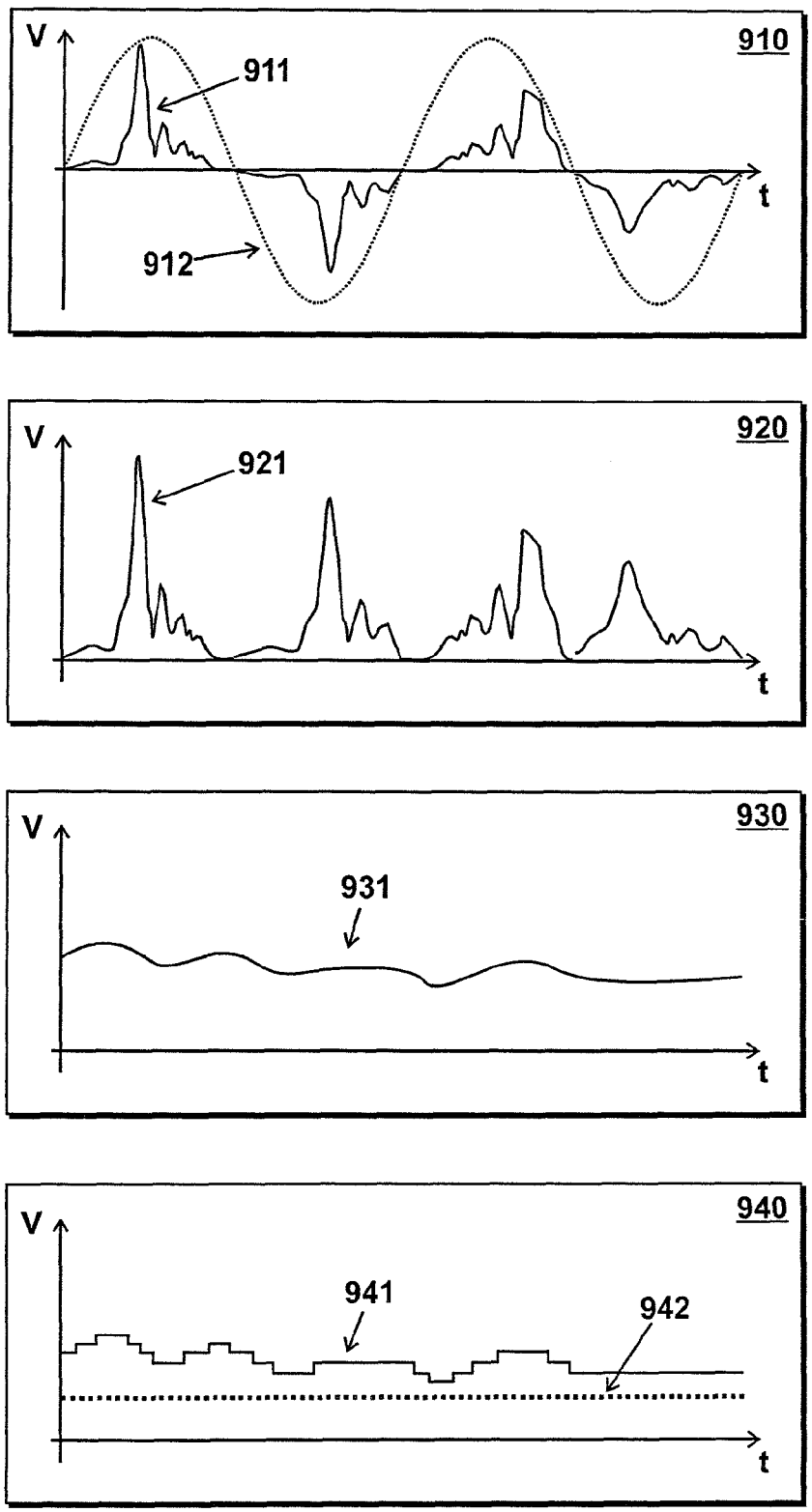
FIG. 9 illustrates the various changes to a detected signal from current transformer 711.

The various changes to a detected signal from current transformer 711 as it passes through precision rectifier 712, low pass filter 713 and analogue to digital converter 302 are illustrated in FIG. 9.

Graph 910 illustrates a detected signal 911 from current transformer 711 when sampled at output 721, along with the alternating current 912 that could potentially be drawn by projector 101. As can be seen, detected signal 911 is very non-linear, with very high frequency peaks and troughs. Additionally, as the signal alternates between positive and negative values, any averaging of the signal would result in an output average level of zero.

Graph 920 illustrates a rectified signal 921 from precision rectifier 712 when sensed at output 722. Rectified signal 921 takes all positive values, and thus averaging may take place to produce a meaningful output value.

Graph 930 illustrates a filtered signal 931 after being filtered by low pass filter 913. As shown, all high frequency components in rectified signal 921 have been removed, resulting in a filtered signal indicative of the average current flow from the mains supply to projector 101.

Graph 940 illustrates a converted signal 941 after being sampled by analogue to digital converter 302. As shown, signal level values have been assigned into digital level bins for comparison by microcontroller 303 to a threshold value 942.

FIG. 10

Figure 10:
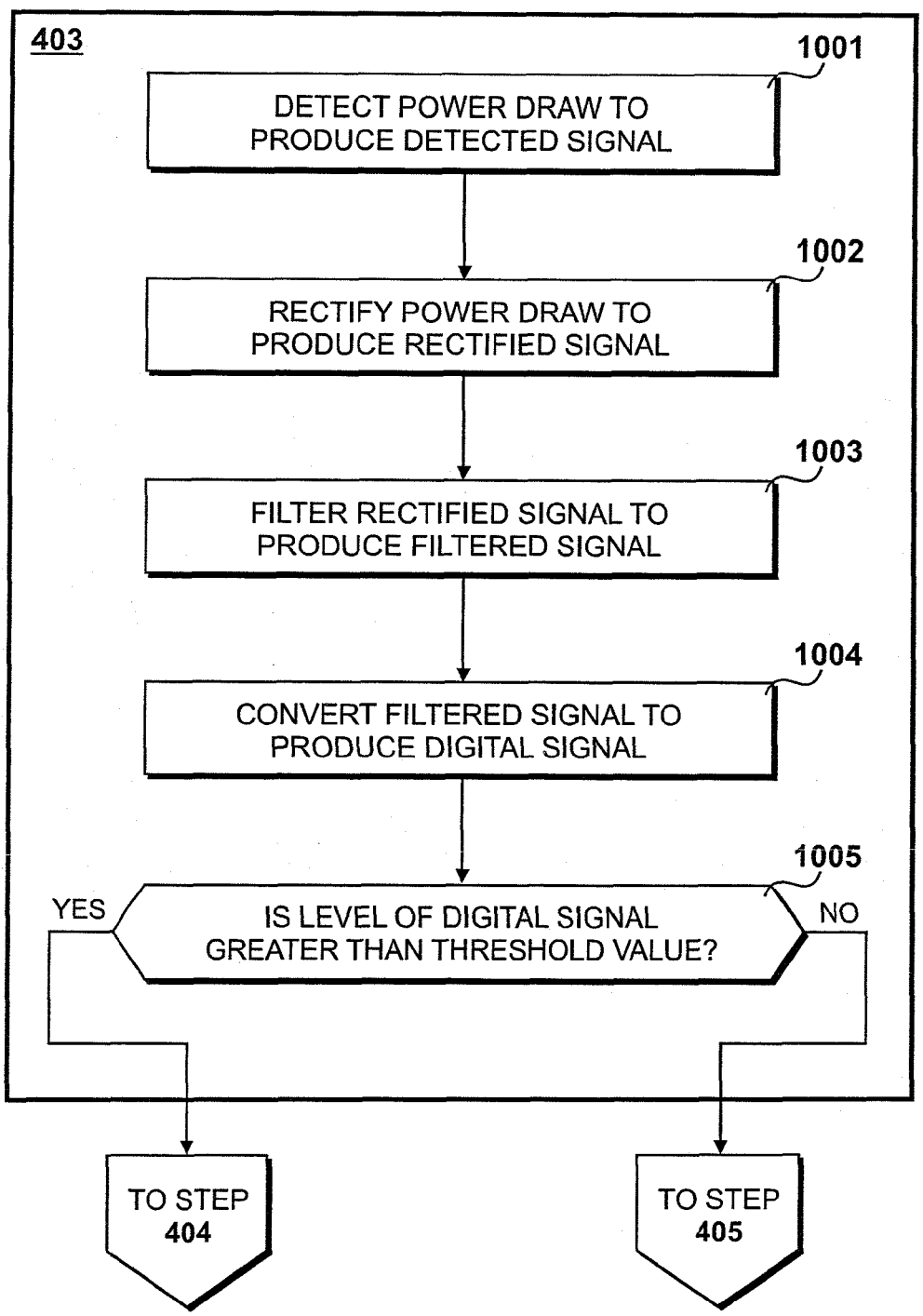

Steps carried out during step 403 to determine whether the project is currently on are shown in FIG. 10.

At step 1001, the power draw by projector 101 is detected by current transformer 711 to produce detected signal 911. At step 1002, detected signal 911 is rectified by precision rectifier 712 to produce rectified signal 921. At step 1003, rectified signal 921 is filtered by low pass filter 713 to produce filtered signal 931 indicative of the average current flow from the mains supply to projector 101.

At step 1004, filtered signal 931 is converted into digital samples by analogue to digital converter 302 to produce digital signal 941. It is to be appreciated that in alternative embodiments of the present invention, this step may be omitted if processing, such as comparison of signal levels, is to take place using analogue electronics.

At step 1005, a question is asked as to whether the level digital signal 941 is greater than threshold value 942. If this question is answered in the affirmative, to the effect that digital signal 941 is greater than threshold value 942, then this indicates that projector 101 is powered on. Control therefore proceeds to step 404. If the question asked at step 1005 is answered in the negative, to the effect that digital signal 941 is less than threshold value 942, then this indicates that projector 101 is already turned off. Control therefore proceeds to step 405.

FIG. 11

Figure 11:
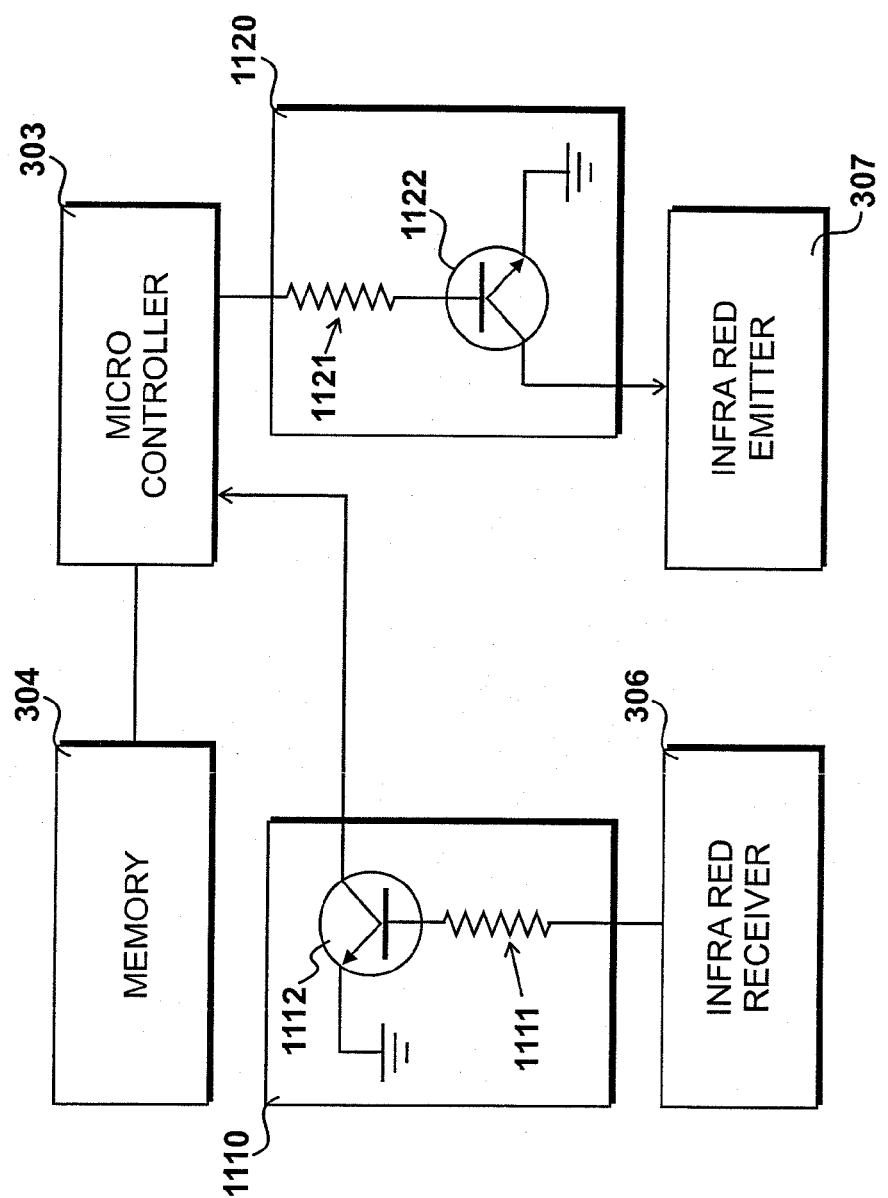
FIG. 11 illustrates the connection of infrared receiver 306 and infrared emitter 307 to microcontroller 303.

The connection of infrared receiver 306 and infrared emitter 307 to microcontroller 303 in order to record and emit a shutdown command to projector 101 is illustrated in FIG. 11.

Infrared receiver 306 is connected to microcontroller 303 by a first switch 1110. Infrared receiver 306 produces a current proportional to infrared radiation incident on it. Switch 1110 comprises a resistor 1111 and a transistor 1112. The resistor feeds current from infrared receiver 306 to the base of transistor 1112, whose emitter is connected to ground and whose collector is connected to an input in microcontroller 303. When the current produced by infrared receiver rises above a threshold (determined by the value of resistor 1101), transistor 1112 turns to its "on" state and a voltage is developed between microcontroller 303 and ground. Microcontroller 303 records this developed voltage as indicative of a pulse of infrared radiation that has been received by infrared receiver 306. This enables apparatus 201 to record a pulse sequence emitted by a remote control.

Infrared emitter 307 is connected to microcontroller 303 by a second switch 1120. Switch 1120 operates in a similar way to switch 1110, except in this case receiving a current from microcontroller 303 and thereby allowing infrared emitter 307 to emit infrared radiation. In this respect, a resistor 1121 connects microcontroller 303 to a transistor 1122, whose emitter is connected to ground and whose collector is connected to infrared transmitter 307. When microcontroller 303 passes sufficient current through resistor 1121, transistor 1121 will switch to its "on" state and allow a voltage to develop between infrared emitter 307 and ground, thus enabling the emission of infrared radiation. This allows a recorded pulse sequence to be emitted by apparatus 201.

FIG. 12

Figure 12:
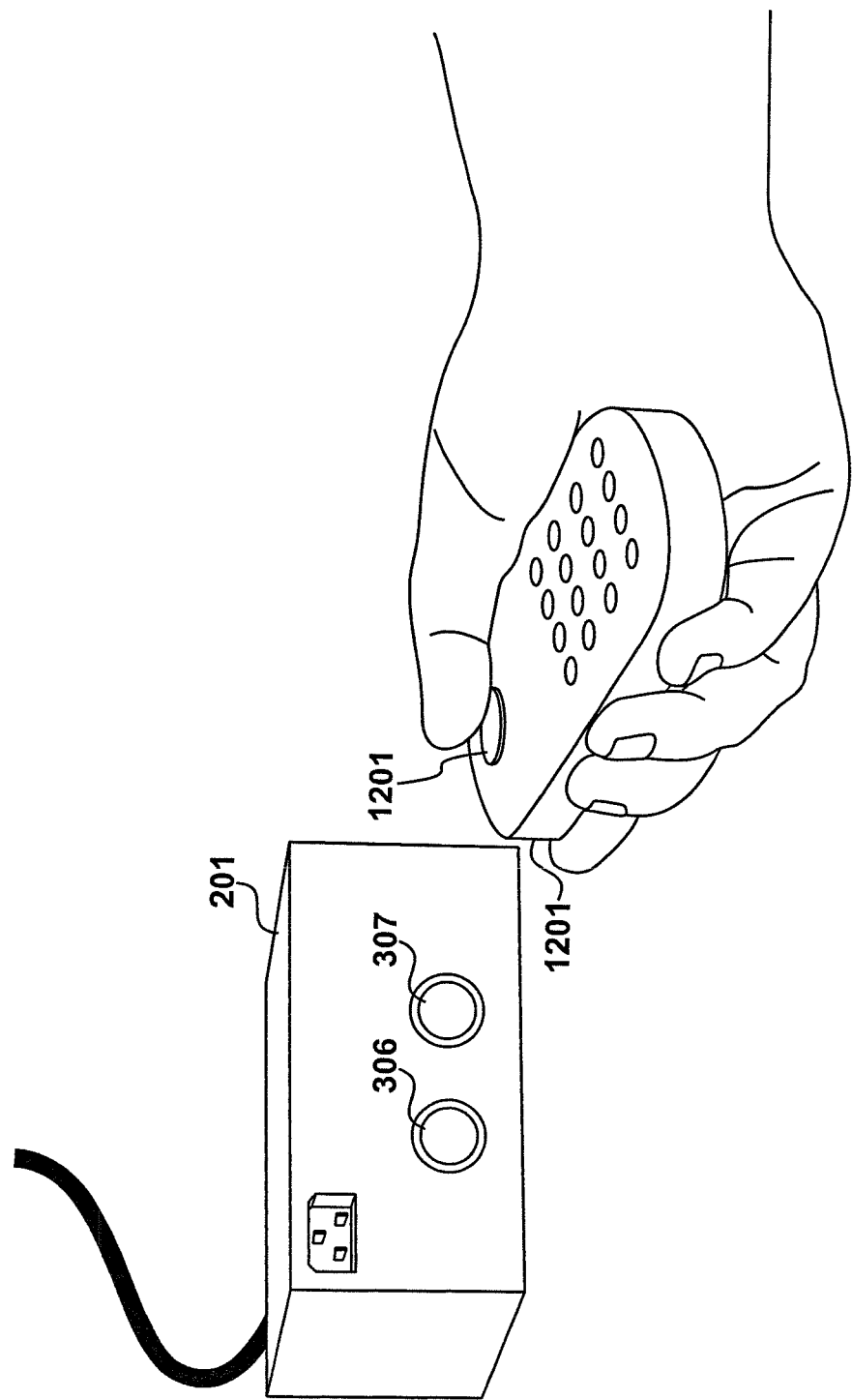
FIG. 12 shows a view of a user recording an infrared pulse sequence from a remote control.

A user recording an infrared pulse sequence from a remote control corresponding to the shutdown command for projector 101 is shown in FIG. 12.

As part of a set up routine, apparatus 201 requires the recording of the shutdown command for projector 101 from is complementary remote control 1201. Thus, a user directs remote control 1201 toward infrared receiver 306 and proceeds to press a key 1202 that causes the sending of the shutdown command via infrared. Upon receiving the shutdown command, microcontroller 303 records the infrared pulse sequence and stores it in memory 304. The process of recording the infrared pulse sequence will be described further with reference to FIGS. 13, 14 and 15.

FIG. 13

Figure 13:
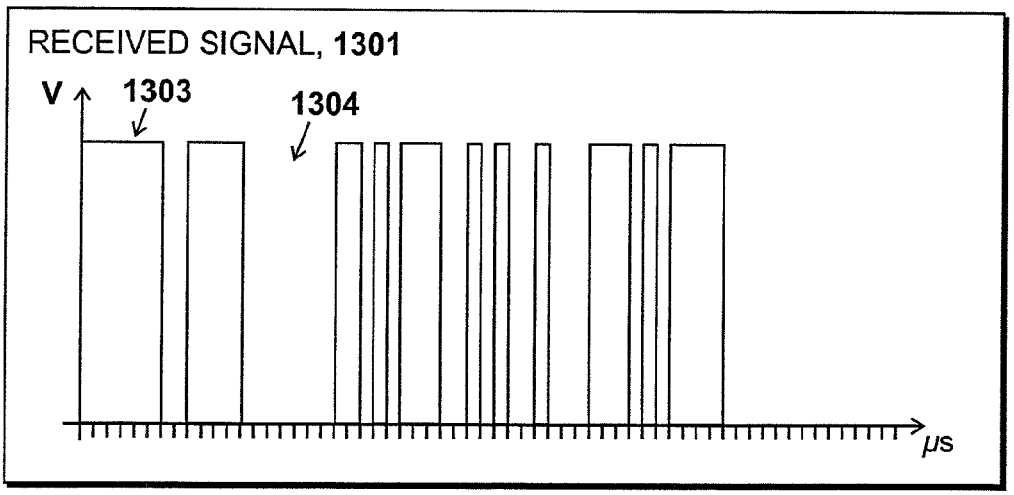
FIG. 13 illustrates the received infrared pulse sequence and its storage in memory 304.

The received infrared pulse sequence and its storage in memory 304 is shown in FIG. 13.

When a user presses key 1202, infrared receiver 306 receives an infrared pulse sequence. This causes transistor 1102 to switch on or off in accordance with the received pulses in the sequence. Microcontroller 303 detects this switching, and receives a signal 1301.

By using its internal processor clock (operating at a high frequency, such as 1 MHz), microcontroller 303 is able to record the duration of each pulse in signal 1301 to a high accuracy. With a clock running at 1 MHz, for example, measurements of pulses of length 1 microseconds are possible.

As shown in the Figure, signal 1301 comprises a series of short pulses corresponding to a pulse of infrared radiation from remote control 1201. Microcontroller 303 records the sequence in a data structure 1302 in memory 304. The data structure comprises key-value pairs, with odd-numbered key indexes representing an "on" state (such as pulse 1303) and even-numbered key indexes representing an "off" state (such as gap 1304). The values represent the length of time in microseconds.

FIG. 14

Figure 14:
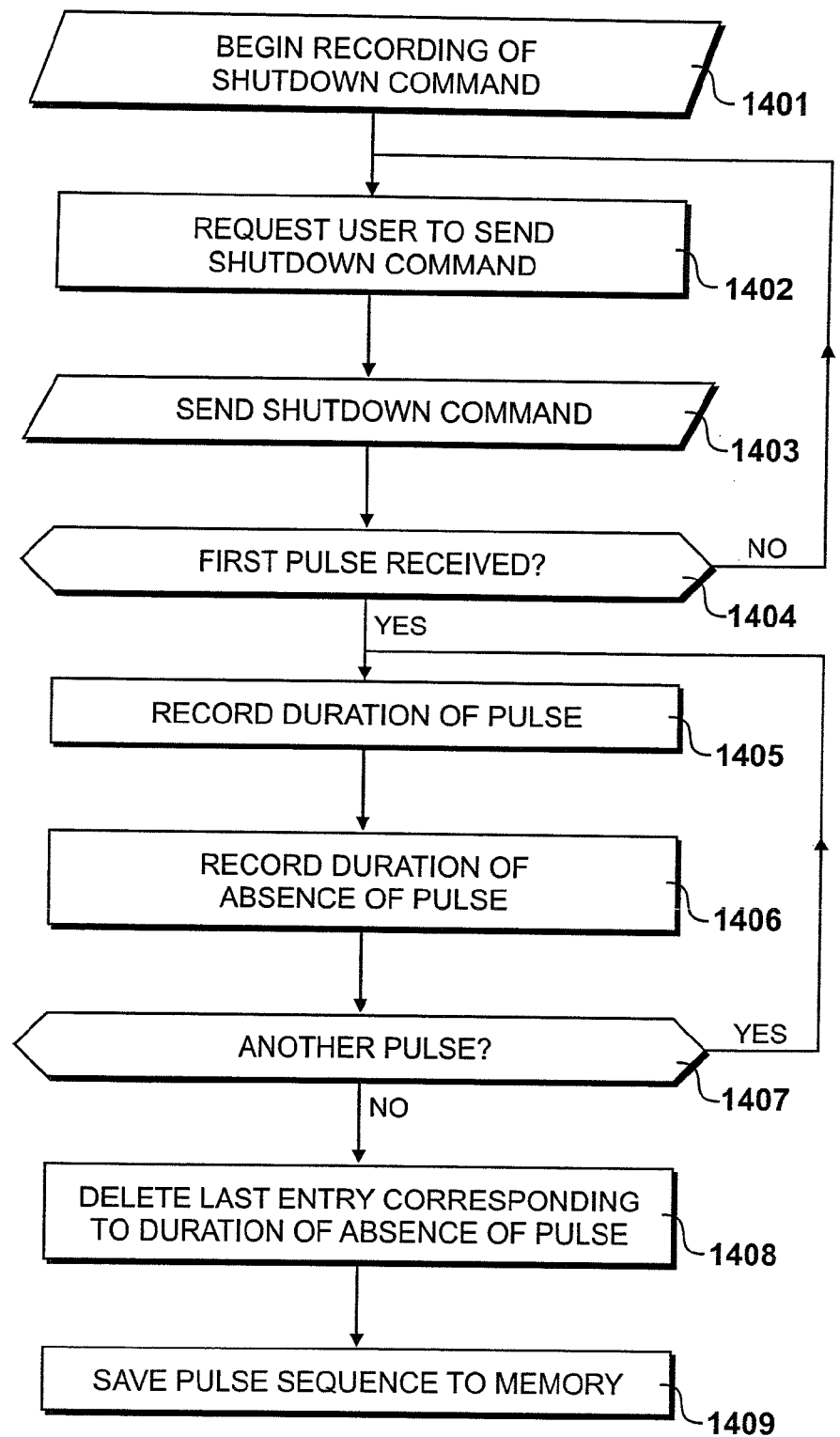
FIG. 14 shows steps carried out to record time values in data structure 1302.

Steps carried out to record time values in data structure 1302 are shown in FIG. 14.

At step 1401, a user input is received instructing microcontroller to begin recording of the shutdown command for projector 101. At step 1402, apparatus 201 requests the user to send the shutdown command by pressing key 1202 on remote control 1201. At step 1403, the user sends the shutdown command, and at step 1404 a question is asked as to whether the first infrared pulse has been received. If this question is answered in the negative, then control returns to step 1402 as there has been an error in receiving the shutdown command. If the question asked at step 1404 is answered in the affirmative, then at step 1405 the duration of the pulse is recorded (corresponding to an "on" state and thus stored with an odd-numbered key in data structure 1302), and at step 1406 the duration of the absence of a pulse is recorded (corresponding to an "off" state and thus stored with an even-numbered key in data structure 1302).

If another pulse is received, then the question asked at step 1407 as to whether there is another pulse is answered in the affirmative and control returns to step 1405.

If no further pulse is received, then control proceeds to step 1408 where the last entry in data structure 1302 corresponding to the duration of an absence of a pulse is deleted. Thus, the final entry in data structure 1302 has an odd-numbered index key, and corresponds to an "on" state.

At step 1409, the data structure is saved permanently to memory 304.

FIG. 15

Figure 15:
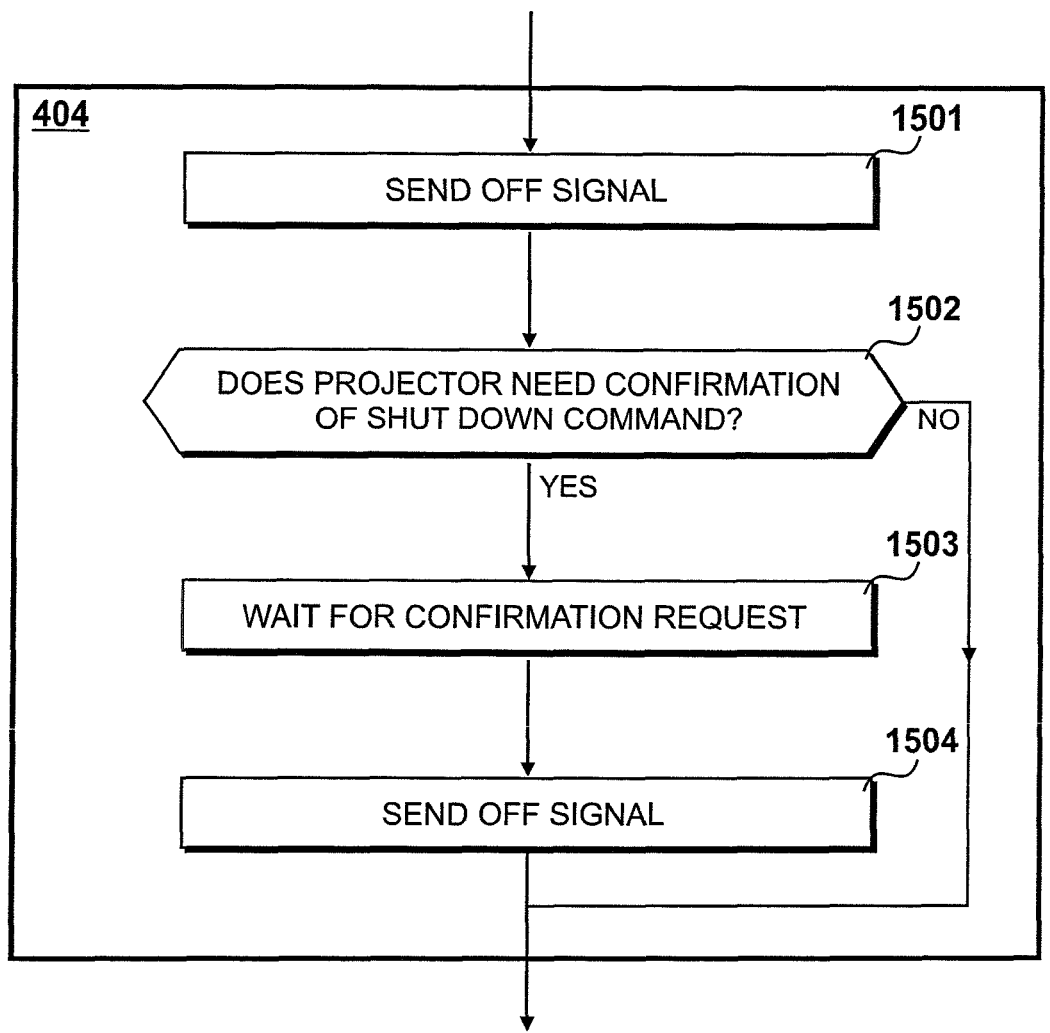
FIG. 15 shows steps carried out during step 404 to instruct projector 101 to turn off.

Steps carried out during step 404 to instruct projector 101 to turn off are shown in FIG. 15.

At step 1501, the shutdown command is sent to projector 101, and at step 1502 a question is asked as to whether projector 101 requires confirmation of the shutdown command in order to turn off. Many models of projectors require two presses of off keys such as key 1202 in order to effect their shutdown routine as a way of guarding against unwanted loss of functionality. Thus, if answered in the negative, to the effect that the projector does not require a confirmation signal to be sent, then step 404 is complete.

If the question asked at step 1502 is answered in the affirmative, to the effect that the projector does require a confirmation signal to be sent, then at step 1503 microcontroller 303 waits for projector 101 to issue its request for confirmation (in the majority of cases immediately), and at step 1504 sends the shutdown command to projector 101 again, and step 404 is complete.

FIG. 16

Figure 16:
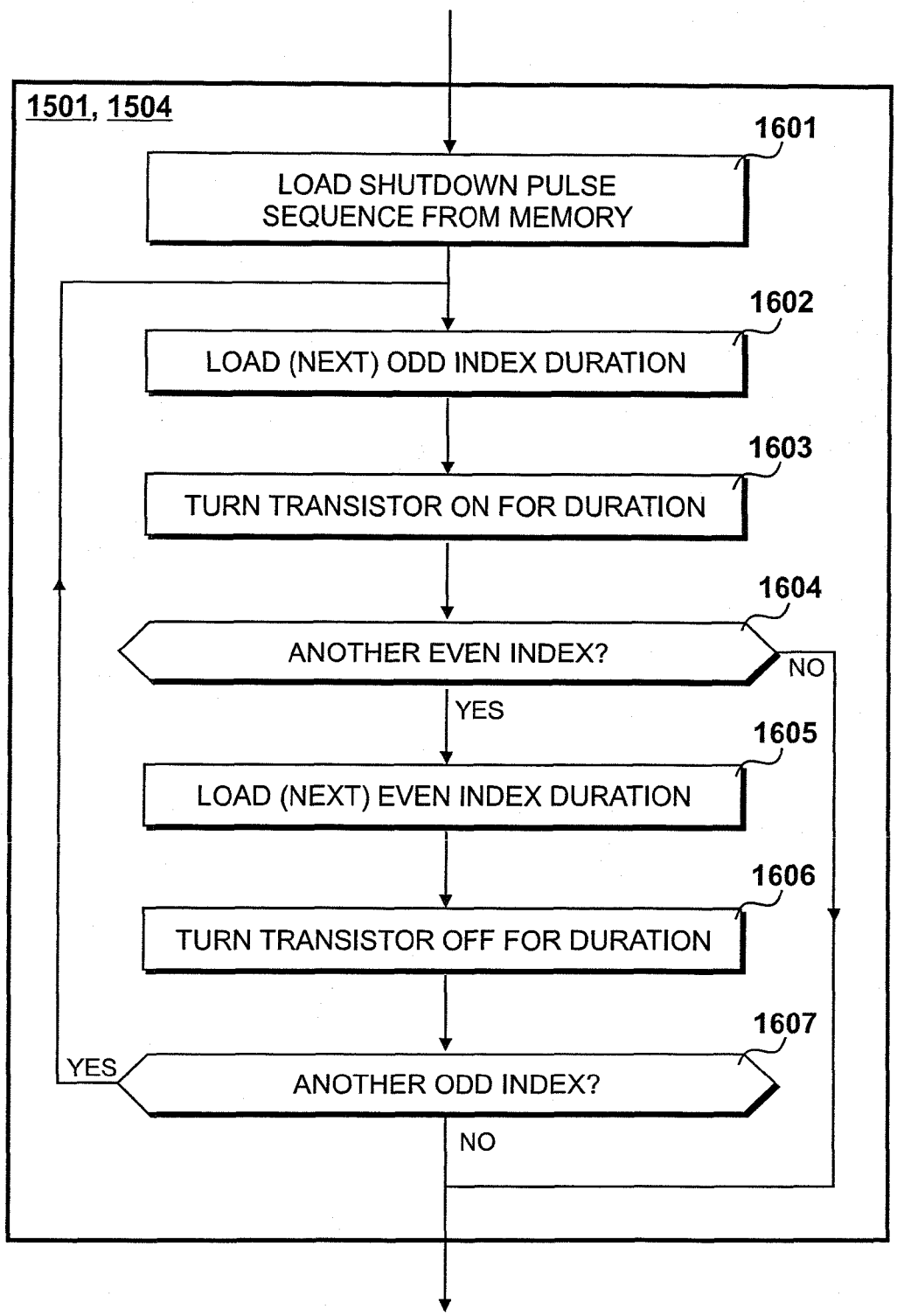
FIG. 16 shows steps carried out during steps 1501 and 1504 to send the shutdown command pulse sequence.

Steps carried out during step 1501, and similarly in step 1504, to send the shutdown command pulse sequence are shown in FIG. 16.

At step 1601, data structure 1302 representing the shutdown command's pulse sequence is loaded from memory 304, and at step 1602 the first odd-numbered indexed key's value is loaded. At step 1603, transistor 1122 is turned on for the duration defined by the value loaded in step 1602. At step 1604, a question is asked as to whether there is another even-numbered indexed key in data structure 1302, and if answered in the negative then the pulse sequence has been sent and steps 1501 and 1504 are complete.

If the question asked at step 1604 is answered in the affirmative, then at step 1605, the first even-numbered indexed key's value is loaded. At step 1606, transistor 1122 is turned off for the duration defined by the value loaded in step 1605.

At step 1607, a question is asked as to whether there is another odd-numbered indexed key in data structure 1302, and if answered in the affirmative then control returns to step 1602 where the next odd-numbered indexed key's value is loaded. If the question asked at step 1607 is answered in the negative, then the pulse sequence has been sent and steps 1501 and 1504 are complete.

Thus, apparatus 201 identifies that projector 101 should not be powered on, identifies that the power draw of projector 101 is above a threshold value, and in turn instructs projector 101 to turn off. This allows projector 101 to shut down in accordance with its power down routine, comprising the steps of allowing bulb 213 to slowly lower in brightness until it is dimmed, and maintaining the cooling by fan 214. This has the effect of increasing the apparent lifetime of bulb 213, as it is only powered on when projector 101 is in use.

What we claim is:

1. A method comprising turning off a projector, said method including steps of:
   identifying a condition to the effect that said projector should not be powered on;
   identifying a condition to the effect that the power draw of said projector is above a threshold value; and
   instructing said projector to turn off, said instructing including emitting an infrared pulse sequence that instructs said projector to turn off in accordance with its power down routine; and
   wherein said infrared pulse sequence is recorded from a complimentary remote control of said projector and stored in memory.

2. The method of claim 1, wherein said infrared pulse sequence is recorded by monitoring the emission of infrared pulses from said remote control and registering the duration of each pulse with reference to a high frequency clock signal.

3. An apparatus for turning off a projector, comprising a processing device, memory, a sensor for detecting power draw and an infrared emitter, wherein said processing device is configured to:
   identify a condition to the effect that said projector should not be turned on;
   identify a condition to the effect that the power draw of said projector is above a threshold value by using said sensor; and
   instruct said infrared emitter to emit a signal instructing said projector to turn off in accordance with its power down routine;
   the apparatus further comprising an infrared detector configured to record, in said memory, said infrared pulse sequence from a complementary remote control of said projector.

4. A projector system comprising a projector, a processing device, memory, a sensor for detecting power draw and an infrared emitter. wherein said processing device is configured to:
   identify a condition to the effect that said projector should not be turned on;
   identify a condition to the effect that the power draw of said projector is above a threshold value by using said sensor; and
   instruct said infrared emitter to emit a signal instructing said projector to turn off in accordance with its power down routine;
   the projector system further comprising an infrared detector configured to record, in said memory, said infrared pulse sequence from a complementary remote control of said projector.

* * * * *